June 30, 1942.  J. ZUNINO  2,287,955
DEVICE FOR MOVEMENT OF AIRCRAFT
Filed March 31, 1941
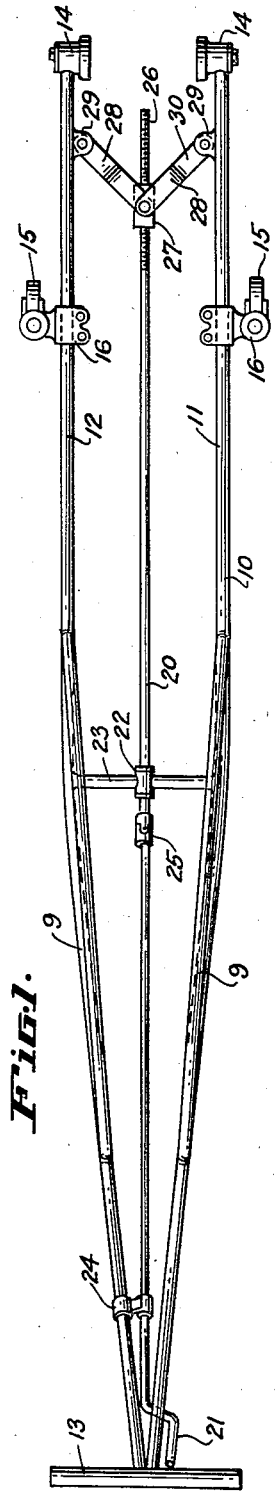
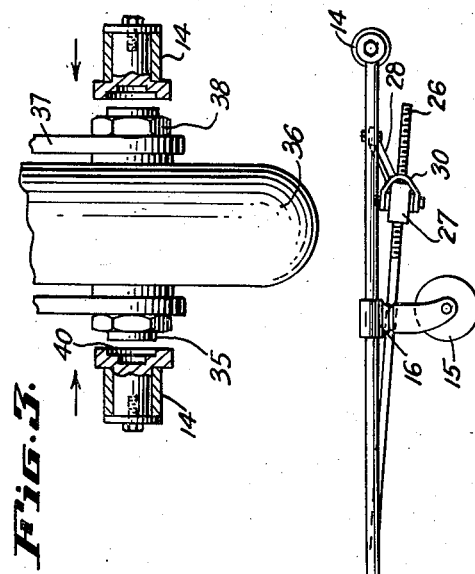
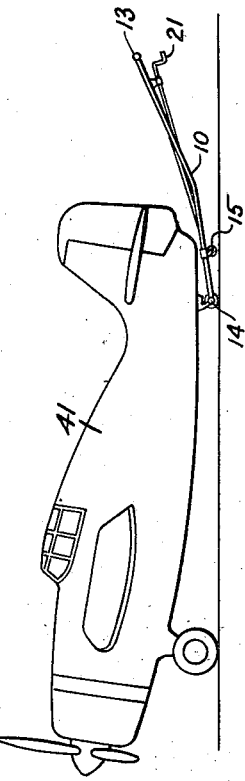
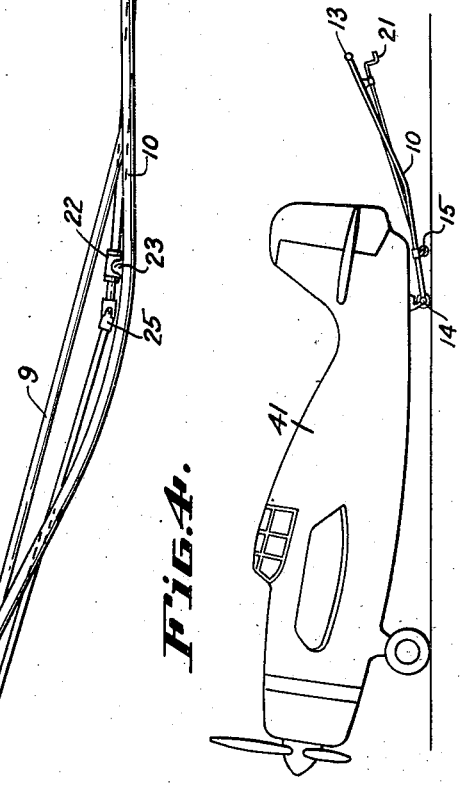
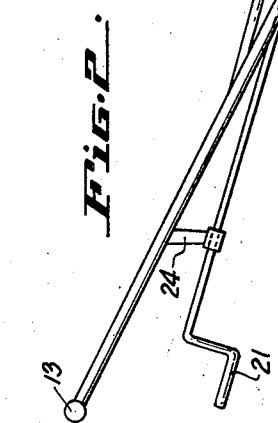
INVENTOR.
JOSEPH ZUNINO
BY
ATTORNEY.

Patented June 30, 1942

2,287,955

UNITED STATES PATENT OFFICE 2,287,955

DEVICE FOR MOVEMENT OF AIRCRAFT

Joseph Zunino, San Francisco, Calif.

Application March 31, 1941, Serial No. 386,049

8 Claims. (Cl. 214—65.5)

This invention relates to means for handling aircraft and has for one of its principal objects the provision of efficient means for the movement and handling of aircraft in and out of hangars or other places of storage and maintenance shops.

Among the objects of the invention is the provision of simplified means whereby a steerable wheel in the landing gear of aircraft may be engaged for convenient movement of the ship. It is well known that modern aircraft employ several different types of landing gear, in each of which there is at least one steerable wheel. The present invention, when engaging such a wheel, is useful as a tow bar means for movement of the ship manually or by power means, such as a tractor. Additionally, the invention is useful as a dolly in maneuvering aircraft in crowded storage spaces. Moreover, the device forming the subject-matter of this application is extremely simple in construction, inexpensive to manufacture, light in weight and easy to operate.

Other objects of the invention will become more apparent as this specification proceeds.

While it is true that there are in the prior art certain instances wherein dollies, jacks and the like have been devised for the handling of aircraft in and around hangars and maintenance shops, the fact remains that none of them has met with anything approaching universal adoption and the prevailing practice is therefore to detail two or more men from the ground crews to manually move the ships, as by pulling on the wing structure. The present invention meets the needs of the art and makes it possible for one operator to conveniently handle the smaller airships.

In the drawing forming a part hereof:

Fig. 1 is a plan view of the device forming the subject-matter hereof,

Fig. 2 is a side elevation of the same,

Fig. 3 is a diagrammatical view showing the tail wheel engaging members in section and Fig. 4 is a side elevation of the apparatus as used in conjunction with aircraft.

The tail wheel fork forming the subject-matter of this application is preferably constructed of one of the modern strong, but extremely lightweight, alloy metals, such as chrome molybdenum, in tubular form. In the preferred construction illustrated, the device has a frame 10 formed of two parallel tubular members 11 and 12 spaced apart at their forward ends and bent upwardly and converging at their opposite ends for connection to a suitable handle 13. In order to strengthen the frame 10 I provide a spanner or cross brace 9 for each of the tubular members 11 and 12, extending across the upward bend in the same and joined thereto, as by welding.

At their forward ends the tubular members 11 and 12 are provided with the opposed tail wheel shaft engaging cups 14. The assembly is provided with a pair of caster wheels 15, adjacent the forward ends, there being one such caster wheel connected to each of the tubular members 11 and 12 by a bracket such as 16. Thus, the device may be readily transported from one operation to another.

In the form illustrated herein, the wheel engaging cups 14 are clamped upon the steerable wheel of aircraft through the flexing of the forward or outer ends of the tubular members 11 and 12. This flexing of the ends of the tubular members 11 and 12 is accomplished by means of the crank mechanism illustrated to best advantage in Figs. 1 and 2. A crank shaft 20 extends longitudinally of the frame 10 between the members 11 and 12 and is journaled in a bushing 22 in the spacer 23 extending transversely between the members 11 and 12. The crank shaft 20 is additionally journaled in a bearing member 24 fixed on the tubular member 12 adjacent the handle 13, and the end of the crank shaft 20, projecting beyond the bearing 24, is provided a suitable crank 21 for manual operation. Additionally, shaft 20 includes a universal joint 25 to bring it within substantial alignment with the upward bend of frame 10.

The opposite end of the crank shaft 20 is threaded, as at 26, and engages a block 27. The operative connection between the outer ends of the tubular members 11 and 12 and the crank shaft 20 is in the form of contractor bars or links 28, each of which is pivotally connected at its outer end to the members 11 and 12 by means of the lugs 29. Each contractor bar 28 has a yoke 30 at its inner end for suitable connection to the block 27, such as by the bolted connection illustrated in Figs. 1 and 2.

It will thus be appreciated that (looking at Fig. 1 from left to right) clockwise rotation of the crank 21 will cause the block to move toward the handle 13 and thus draw the wheel engaging cups 14 together in a clamping action.

The use of the invention with aircraft having conventional tail wheel assemblies is illustrated to best advantage in Figs. 3 and 4. Such assemblies usually include an axle 35, a wheel 36 thereon, and a fork 37 connected to the tail of the fuselage of the aircraft. The universal practice is to employ nuts 38 threadably engaging shaft 35 to retain the wheel in proper alignment and, as illustrated in Fig. 3, a portion of axle 35 protrudes beyond the face of the nuts 38.

In view of existing safety regulations and the reasons underlying them, it is essential that adequate provision be made to avoid damage and injury to the aircraft and its parts in the use of devices such as that forming the subject-matter hereof. Hence, each of the cups 14 is provided with a recess 40 designed to receive the protruding ends of the axle 35, and permit the face of the cup 14 to bear against the face of the nut 38.

It will be appreciated, of course, that the cups 14 may take forms other than that shown to meet changes in the construction of aircraft tail wheel assemblies without departing from the spirit of this invention.

When the tail wheel assembly of an aircraft 41 has been engaged by the cups 14, the device is raised to a point where caster wheels 15 are clear of the ground, and the device is then ready to function as a draw bar for manual, tail-first movement of the plane. When thus drawn it will be understood that the plane is moved on its three wheels (see Fig. 4).

Reference has heretofore been made to use of this device as a dolly for movement of the tail of a plane. By engaging the axle 35 and using caster wheels 15 as a fulcrum it will be appreciated that the tail of a plane may be lifted and shifted as desired.

It will be appreciated that in this application I have shown and described only a preferred form of the invention and that since it may take other forms without departing from its spirit, I desire full protection according to the scope of the appended claims.

The invention claimed is:

1. A device for movement of aircraft by engagement with a steerable wheel in the landing gear, comprising a pair of stiff but yieldable members spaced apart at one end and converging at the other to define a frame, a pair of opposed aircraft wheel engaging members on the spaced apart ends of the frame members, and means for flexing said yieldable frame members to draw together the spaced apart ends thereof and thus to move the said wheel engaging members from inoperative to operative position.

2. A device for movement of aircraft by engagement with a steerable wheel in the landing gear, comprising a pair of stiff but yieldable members spaced apart at one end and converging at the other end to define a frame, a spacer between the frame members in spaced relation to the converged ends, a pair of opposed aircraft wheel engaging members on the spaced apart ends of the frame members, and means for flexing said yieldable frame members to draw together the spaced apart ends thereof and thus to move the said wheel engaging members from inoperative to operative position.

3. A device for movement of aircraft by engagement with a steerable wheel in the landing gear, comprising a pair of stiff but yieldable members spaced apart at one end and converging at the other to define a frame, spacer means between the frame members in spaced relation to the converged ends, a handle at the converged ends of the frame members, wheels on the frame, a pair of opposed aircraft wheel engaging members on the spaced apart ends of the frame members, and means for flexing said yieldable frame members to draw together the spaced apart ends thereof and thus to move the said wheel engaging members from inoperative to operative position.

4. A device for movement of aircraft by engagement with a steerable wheel in the landing gear, comprising a pair of stiff but yieldable members spaced apart at one end and converging at the other to define a frame, spacer means between the frame members in spaced relation to the converged ends, a handle at the converged ends of the frame members, wheels on the frame, a pair of opposed aircraft wheel engaging members on the spaced apart ends of the frame members, and means for drawing together the spaced apart ends of the frame members to move the wheel engaging members carried thereby from inoperative to operative position.

5. A device for movement of aircraft by engagement with a steerable wheel in the landing gear, comprising a pair of stiff but yieldable members spaced apart at one end and converging at the other to define a frame, spacer means between the frame members in spaced relation to the converged ends, a handle at the converged ends of the frame members, wheels on the frame, a pair of opposed aircraft wheel engaging members on the spaced apart ends of the frame members, a contractor bar connected to each of the frame members adjacent the wheel engaging members carried thereby, and crank actuated means having operative connection with the contractor bars to cause the wheel engaging members to be moved from inoperative to operative position.

6. A device for movement of aircraft by engagement with a steerable wheel in the landing gear, comprising a pair of stiff but yieldable members spaced apart at one end and converging at the other to define a frame, spacer means between the frame members in spaced relation to the converged ends, a handle at the converged ends of the frame members, wheels on the frame, a pair of opposed aircraft wheel engaging members on the spaced apart ends of the frame members, contractor bars connected at one end to each of the frame members adjacent the wheel engaging members carried thereby and at their opposite ends to a block, and a crankshaft journaled in said frame having threaded engagement with said block.

7. A device for movement of aircraft by engagement with the landing gear comprising a pair of stiff but yieldable members spaced apart at one end and converging at the other to define a frame, spacer means between the frame members in spaced relation to the converged ends, a handle at the converged ends of the frame members, wheels on the frame, a pair of opposed members engageable with the landing gear structure of the aircraft carried by the spaced apart ends of the frame members, a contractor bar connected to each of the frame members adjacent the opposed members carried thereby, and crank actuated means having operative connection with the contractor bars to cause the opposed members carried by the spaced apart ends of the frame members to be moved from inoperative to operative position.

8. A device for movement of aircraft by engagement with the landing gear comprising a pair of stiff but yieldable members spaced apart at one end and converging at the other to define a frame, spacer means between the frame members in spaced relation to the converged ends, a handle at the converged ends of the frame members, a pair of opposed members engageable with the landing gear structure of the aircraft carried by the spaced apart ends of the frame members, contractor bars connected at one end to each of the frame members adjacent the opposed members carried thereby and at their opposite ends to a block, and a crankshaft journaled in said frame having threaded engagement with said block.

JOSEPH ZUNINO.